(12) United States Patent  (10) Patent No.: US 7,599,422 B2
Stojanovic et al.  (45) Date of Patent: *Oct. 6, 2009

(54) ADJUSTABLE DUAL-BAND LINK

(75) Inventors: Vladimir M. Stojanovic, Lexington, MA (US); Amir Amirkhany, Stanford, CA (US); Jared L. Zerbe, Woodside, CA (US)

(73) Assignee: Rambus Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/268,986

(22) Filed: Nov. 11, 2008

(65) Prior Publication Data

US 2009/0067537 A1  Mar. 12, 2009

Related U.S. Application Data

(60) Continuation of application No. 12/030,700, filed on Feb. 13, 2008, now Pat. No. 7,450,629, which is a division of application No. 11/022,469, filed on Dec. 22, 2004, now Pat. No. 7,349,484.

(51) Int. Cl.
 *H04L 27/30* (2006.01)
(52) U.S. Cl. .................. 375/147; 375/260; 375/316; 370/465; 370/480; 370/485; 455/167.1; 455/228
(58) Field of Classification Search ................ 375/219, 375/222, 147, 260, 316; 370/465, 480, 485; 455/167.1, 167.2, 450, 452.1, 452.2
 See application file for complete search history.

(56) References Cited

U.S. PATENT DOCUMENTS 5,640,423 A   6/1997  Archer ....................... 375/261

6,310,910 B1  10/2001  Shah et al. ................... 375/222
6,934,368 B2   8/2005  Maytal et al. ............ 379/93.08

(Continued)

FOREIGN PATENT DOCUMENTS

WO      WO 01/29991 A2     4/2001

OTHER PUBLICATIONS

Amirkhany, Amir, et al., "Multi-tone Signaling for High-speed Backplane Electrical Links," Feb. 29, 2004.

(Continued)

*Primary Examiner*—Dac V Ha
(74) *Attorney, Agent, or Firm*—Morgan, Lewis & Bockius LLP

(57) ABSTRACT

A communication system utilizing an adjustable link has at least a first data transmission circuit including at least a first communication link circuit. The first communication link circuit has a baseband circuit and at least a passband circuit. The baseband circuit corresponds to a baseband sub-channel and the passband circuit corresponds to a passband sub-channel. The first communication link circuit also includes a circuit that distributes a first subset of a data stream having a first symbol rate to the baseband circuit and a second subset of the data stream having a second symbol rate to the passband circuit. The baseband sub-channel and the passband sub-channel are separated by an adjacent guardband of frequencies. The passband carrier frequency is adjusted to define the guardband and the guardband corresponds to a first notch in a channel response of a first communications channel.

29 Claims, 9 Drawing Sheets

U.S. PATENT DOCUMENTS

| | | | |
|---|---|---|---|
| 7,079,591 B2 * | 7/2006 | Fling et al. | 375/316 |
| 7,280,616 B2 | 10/2007 | Arambegola et al. | 375/316 |
| 2003/0081693 A1 | 5/2003 | Raghavan et al. | 375/298 |
| 2003/0087634 A1 | 5/2003 | Raghavan et al. | 455/423 |
| 2003/0112896 A1 | 6/2003 | Raghavan et al. | 375/322 |
| 2003/0133049 A1 | 7/2003 | Cowley et al. | 725/151 |
| 2003/0134607 A1 | 7/2003 | Raghavan et al. | 455/132 |
| 2003/0236071 A1 | 12/2003 | Ito | 455/59 |
| 2004/0110519 A1 | 6/2004 | Chang et al. | 455/502 |
| 2004/0165670 A1 | 8/2004 | Roy et al. | 375/259 |
| 2005/0245199 A1 | 11/2005 | Batra | 455/73 |

OTHER PUBLICATIONS

Kim, J., et al., "A 2-Gb/s/pin Source Synchronous CDMA Bus Interface with Simultaneous Multi-chip Access and Reconfigurable I/O Capability," Proceedings of the IEEE 2003 Custom Integrated Circuits Conference, Sep. 21-24, 2003, pp. 317-320.

Xu, Z., et al., "A 2.7 Gb/s CDMA-interconnect Transceiver Chip Set with Multi-level Signal Data Recovery for Reconfigurable VLSI Systems," Digest of Technical Papers: International Solid-State Circuits Conference, San Francisco CA, USA, Feb. 9-13, 2003, vol. 1, 2003, pp. 82-83.

International Search Report for International Application No. PCT/US2005/038707 mailed Mar. 3, 2006 (related application).

* cited by examiner

US 7,599,422 B2

ADJUSTABLE DUAL-BAND LINK

CROSS REFERENCE TO RELATED APPLICATION

This application is a continuation of U.S. patent application Ser. No. 12/030,700, filed Feb. 13, 2008, now U.S. Pat. No. 7,450,629, issued Nov. 11, 2008, which is a divisional of U.S. patent application Ser. No. 11/022,469, filed Dec. 22, 2004, now U.S. Pat. No. 7,349,484, issued Mar. 25, 2008, which applications are incorporated by reference herein in their entirety.

FIELD OF THE INVENTION

The present invention relates generally to the communication of data. More specifically, the present invention relates to the communication of data over frequency-selective channels having one or more notches.

BACKGROUND

In typical baseband transmission systems that employ equalization techniques for equalizing channels with low-pass characteristics, a usable bandwidth extends from near DC up to a maximum frequency that is determined by a high-frequency roll-off of a communications channel and signal-to-noise (SNR) requirements of a receiver. Referring to FIG. 4, when a magnitude 310 of a channel response 324 is essentially a monotonically decreasing function of frequency 312, this limitation is straight forward and baseband signaling is able to utilize the full, usable bandwidth of the channel. For example, if a system has adequate SNR with up to 50 dB of channel attenuation then the channel whose magnitude 310 decreases monotonically at 41.6 dB/decade starting at 1 GHz could support baseband signaling over a 0-12 GHz band of frequencies.

It is not unusual, however, for a channel response 314 to include one or more significant notches, such as first notch 316, that result in a local minimum in the magnitude 310. Notches may be associated with reflections (due to differences in impedance, parasitic capacitance and manufacturing tolerances) and other non-idealities. At higher frequencies, the channel response 314 recovers substantially before finally dropping again due to the ultimately low-pass nature of the channel. For such channels, the use of baseband signaling, with a usable signaling bandwidth limited from near DC up to the first notch 316, does not take advantage of all of the usable transmission bandwidth. Additional unutilized bandwidth is available at higher frequencies where the channel response 314 recovers from the first notch 316. Reconsidering the previously described example with the channel response 314 having the first notch 316 in a notch band of frequencies 322 between 4 and 4.5 GHz, the system could only support baseband signaling over a first band of frequencies 318 between 0-4 GHz. A second band of frequencies 320 between 4.5 and 12 GHz, which has less than 50 dB of attenuation, cannot be used with baseband signaling due to the first notch 316. As a consequence, this usable transmission bandwidth is not used in the system. There is a need, therefore, for a signaling system that more effectively utilizes the available bandwidth for channels having low-pass characteristics with one or more significant notches.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF EMBODIMENTS

In one embodiment of an adjustable link, a first transmission communication link circuit has a transmission baseband circuit and a transmission passband circuit. The transmission baseband circuit corresponds to a baseband sub-channel and the transmission passband circuit corresponds to a passband sub-channel. The first transmission communication link circuit also includes a circuit that distributes a first subset of a data stream having a first symbol rate to the transmission baseband circuit and a second subset of the data stream having a second symbol rate to the transmission passband circuit. The first symbol rate and the second symbol rate are each less than a symbol rate of the data stream. The baseband sub-channel and the passband sub-channel are separated by an adjacent guardband of frequencies. The passband carrier frequency is adjusted to define the guardband and the guardband corresponds to a first notch in a channel response of a first communications channel.

In some embodiments, the first communications channel is used for communication between first and second integrated circuits. In some embodiments, the first communication channel is a data bus.

In another embodiment, the link includes a first data receiving communication link circuit. The first receiving communication link circuit has a receiving baseband circuit and at least a receiving passband circuit. The receiving baseband circuit corresponds to a baseband sub-channel and the receiving passband circuit corresponds to a passband sub-channel. The first receiving communication link circuit includes a circuit that combines the first subset of a data stream having the first symbol rate from the baseband receiving circuit and the second subset of the data stream having the second symbol rate from the passband receiving circuit into the data stream. The first symbol rate and the second symbol rate are each less than the symbol rate of the data stream. The baseband sub-channel and the passband sub-channel are separated by an adjacent guardband of frequencies. The passband carrier frequency is adjusted to define the guardband and the guardband corresponds to the first notch in the channel response of the first communications channel.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
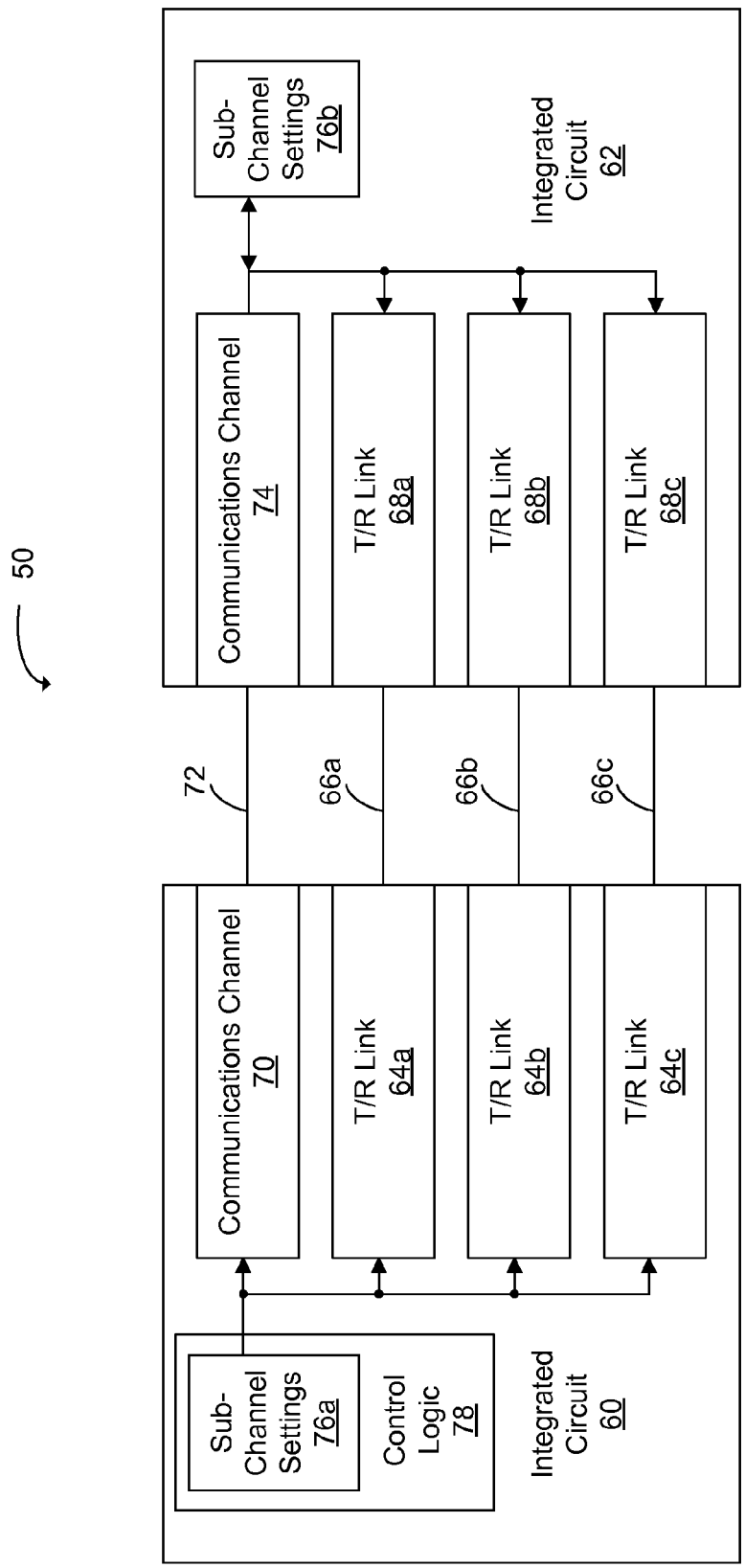
FIG. 1 is a block diagram illustrating a system with an adjustable link.

FIG. 1 illustrates an embodiment of a system 50 having a plurality of adjustable links. A first integrated circuit 60 is coupled to a second integrated circuit 62 via a first communication channel. In the system 50, the first communication channel is illustrated as a data bus having a plurality of signal lines 66. In some embodiments, a length of the signal lines 66 is less than 1 meter. In some embodiments, each signal line, such as signal line 66a, has a respective channel response, which may be different from channel responses of the other signal lines 66. The first integrated circuit 60 has a plurality of data transmission and/or receiving communication link circuits 64, henceforth denoted by transmission/receiving communication link circuits 64, for transmitting and receiving data to and from the second integrated circuit 62. The second integrated circuit 62 also has a plurality of data transmission and/or receiving communication link circuits 68, henceforth denoted by transmission/receiving communication link circuits 68, for transmitting and receiving data to and from the first integrated circuit 60.

Figure 2A:
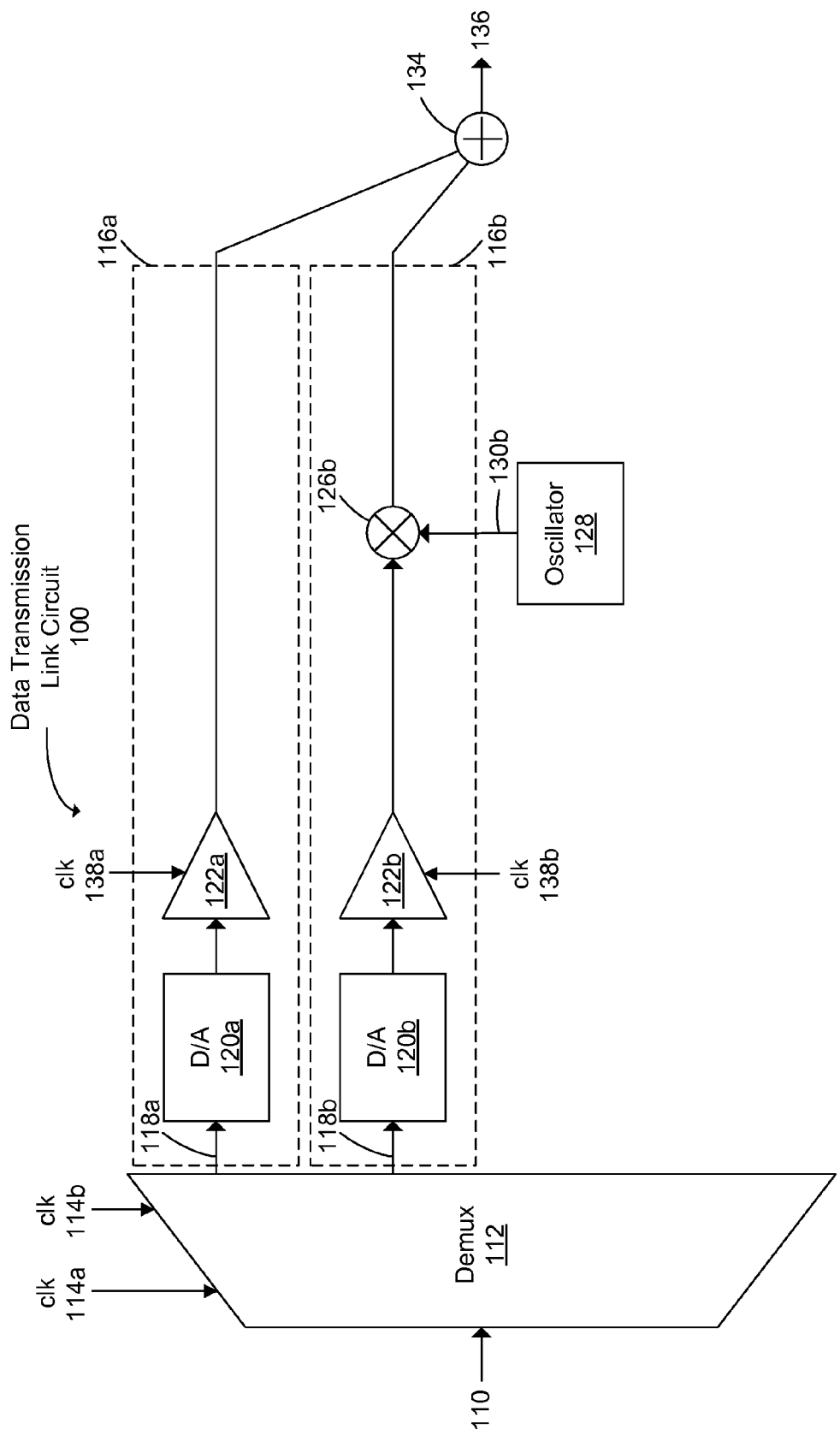
FIG. 2a is a block diagram illustrating a transmission communication link circuit.
Figure 3A:
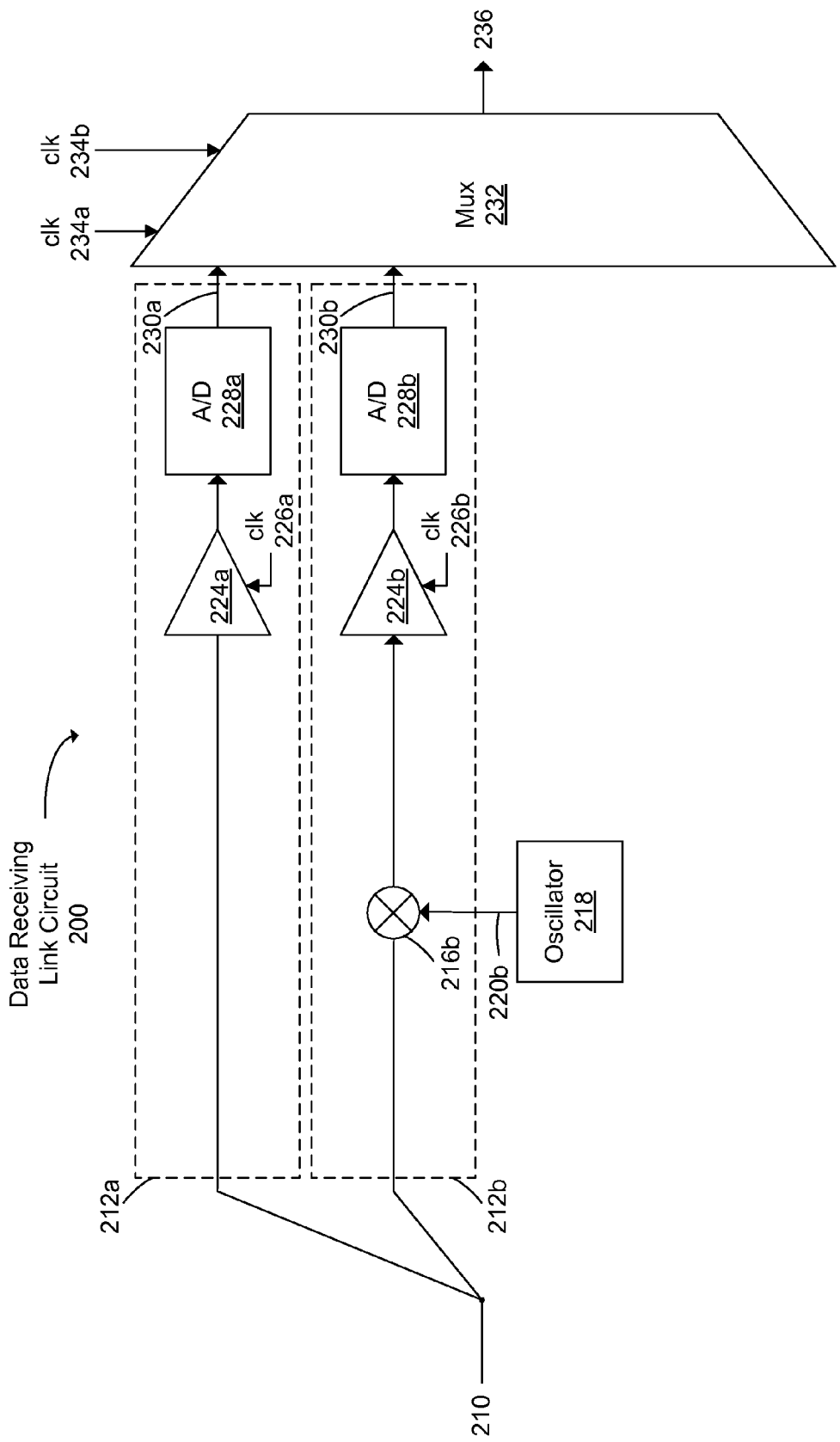
FIG. 3a is a block diagram illustrating a receiving communication link circuit.
Figure 4:
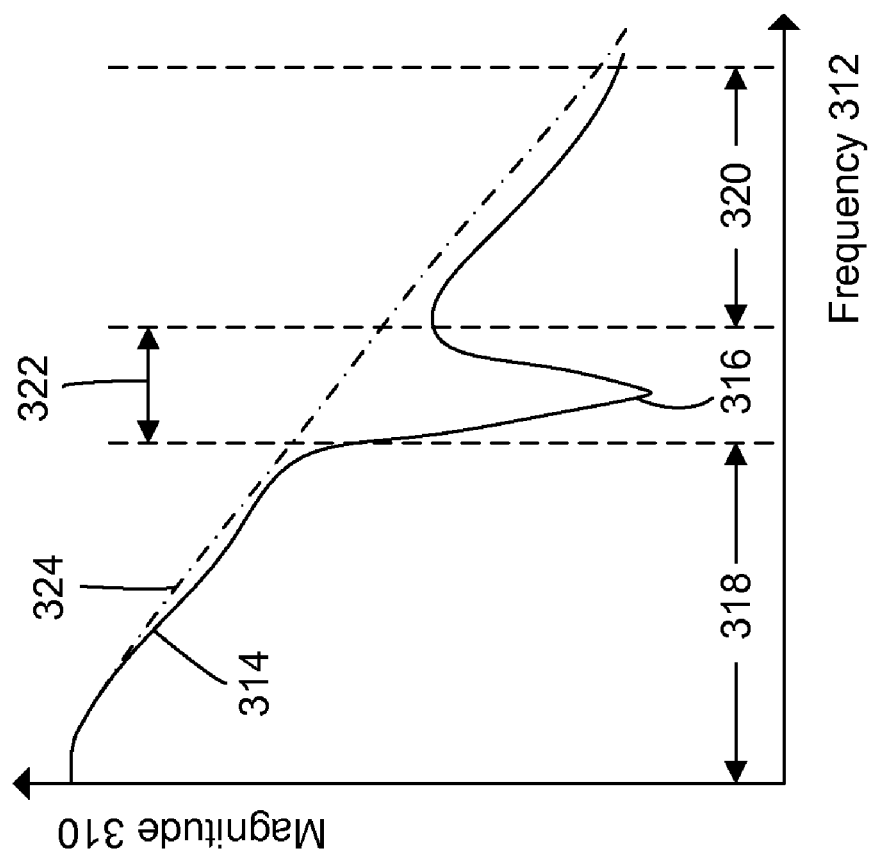
FIG. 4 is a schematic diagram illustrating two channel responses.

Each data transmission/receiving communication link circuit, such as data transmission/receiving communication link circuit 64a, has a respective baseband circuit, such as baseband circuit 116a in FIG. 2a or 212a in FIG. 3a, and at least a respective passband circuit, such as passband circuit 116b in FIG. 2a or 212b in FIG. 3a. The respective baseband circuit corresponds to a baseband sub-channel in the first communications channel. In some embodiments, such as those where the first communications channel is ac-coupled, the respective baseband sub-channel does not contain DC. The passband circuit of a respective data transmission/receiving communication link circuit 64 corresponds to a passband sub-channel in the first communications channel. For a respective data transmission/receiving communication link circuit, a respective band of frequencies corresponding to the baseband sub-channel, such as band of frequencies 318 in FIG. 4, and a respective band of frequencies corresponding to the passband sub-channel, such as band of frequencies 320 in FIG. 4, are separated by a respective adjacent guardband of frequencies. The respective guardband of frequencies, such as the notch band of frequencies 322 in FIG. 4, correspond to a respective notch, such as the first notch 316 in FIG. 4, in a respective channel response of the first communications channel.

In some embodiments, the channel response is a transfer function of the first communication channel. In some embodiments, the channel response is a step response of the first communication channel. In some embodiments, the channel response is an impulse or pulse response of the first communication channel.

The respective baseband sub-channel circuit and the respective passband sub-channel circuit in the respective data transmission/receiving communication link circuit, such as data transmission/receiving communication link circuit 64a, may be adjusted based on one or more performance characteristics of the first communication channel corresponding to one or more respective signal lines, such as signal line 66a. In particular, the respective band of frequencies corresponding to the baseband sub-channel and/or the respective band of frequencies corresponding to the passband sub-channel may be adjusted so as to define the respective guardband of frequencies around a respective notch in the respective channel response. Control logic 78 in the first integrated circuit 60 determines the sub-channel settings for the respective data transmission/receiving communication link circuit. The sub-channel settings for the respective baseband circuit may include one or more low-pass filter corner frequencies and/or a respective clock rate. The sub-channel settings for the respective passband circuit may include one or more respective bandpass filter bandwidths, a respective carrier frequency, a respective fundamental frequency and/or a respective clock rate. The sub-channel settings may be stored in a memory 76a in the first integrated circuit 60. In some embodiments, the memory 76a is separate from the control logic 78, while in other embodiments the memory 76a is embedded within the control logic 78.

The system 50 may include at least a second communications channel for communicating information, including communications channel circuit 70, communications channel circuit 74 and signal line 72. In some embodiments, the information may include sub-channel settings for one or more data transmission/receiving communication link circuits 68 in the second integrated circuit 62. In other embodiments, the information may include data used to train at least one of the data transmission/receiving communication link circuits 64 or 68, such as data transmission/receiving circuit 64a or 68a, during a training mode of operation.

In some embodiments, the sub-channel settings are stored in a memory 76b in the second integrated circuit 62. In the system 50, the second communication channel includes a signal line 72. In some embodiments, the second communication channel may include two or more signal lines. In some embodiments, each pairing of data transmission/receiving communication link circuits in the first integrated circuit 60 and the second integrated circuit 62 may have a separate additional signal line in the second communications channel for communicating respective sub-channel circuit settings.

In other embodiments, sub-channel circuit settings and/or data used to train at least one of the data transmission/receiving communication link circuits 64 or 68 may be communicated using one or more of the signal lines 66 in the first communication channel. For example, the sub-channel circuit settings may be transmitted from the first integrated circuit 60 at a slow data rate that is easily received by the second integrated circuit 62. Alternatively, the sub-channel circuit settings may be transmitted from the first integrated circuit 60 to the second integrated circuit 62 using a dedicated small-bandwidth passband sub-channel.

In some embodiments, the first communication channel may include one or more additional notches in the channel response. In some embodiments, the data transmission/receiving communication link circuits 64 in the first integrated circuit 60 and the data transmission/receiving communication link circuits 68 in the second integrated circuit 62 may include one or more additional passband circuits corresponding to additional passband sub-channels. The band of frequencies corresponding to each additional passband sub-channel is separated from the band of frequencies of a lower passband sub-channel by a respective guardband of frequencies. A respective guardband of frequencies corresponds to a respective notch in the respective channel response of the first communications channel.

The system 50 in FIG. 1 shows 3 data transmission/receiving communication link circuits 64 and 3 data transmission/receiving communication link circuits 68. In other embodiments, the system 50 may have 1, 2 or more than 3 pairs of data transmission/-receiving communication link circuits 64 and 68.

The system 50 in FIG. 1 illustrates a set of adjustable links for inter-chip communication. In some embodiments, the adjustable link may be used for intra-chip communication, such as between modules in an integrated circuit, such as the first integrated circuit 60.

In some embodiments, the combined bandwidth of the respective baseband sub-channel and the one or more passband sub-channels in the first communication channel for each pair of data transmission/receiving communication link circuits 64 and 68 is more than 1 GHz, 2 GHz, 10 GHz or 12 GHz. In some embodiments, the band of frequencies corresponding to the guardband is at least 0.25 GHz wide, 0.5 GHz wide, 1.0 GHz wide or 2.0 GHz.

FIG. 2a illustrates an embodiment of data transmission communication link circuit 100. The data transmission link circuit 100 uses multi-tone communication. A data stream 110 having a symbol rate is distributed by demultiplexer 112 into a first subset 118a of the data stream 110 and a second subset 118b of the data stream 110 based on clock signals 114. The first subset 118a of the data stream 110 and the second subset 118b of the data stream 110 each have a symbol rate that is less than the symbol rate of data stream 110. The first subset 118a of the data stream 110 is coupled to the baseband circuit 116a. The second subset 118b of the data stream 110 is coupled to the passband circuit 116b. In some embodiments, the data transmission link circuit 100 may include one or more additional passband circuits.

The baseband circuit 116a and the passband circuit 116b each include a digital-to-analog converter 120 and a transmit buffer 122. In some embodiments, the digital-to-analog converter 120 may also include a serializer. The transmit buffers 122 are coupled to adjustable clock signals 138 that gate an output from the transmit buffers 122. The clock signals 114 and the clock signals 138 may be generated from a common signal generator, such as a phase lock loop or a delay lock loop (for example, using a voltage divider), or from separate signal generators.

The output from the transmit buffer 122b is mixed in mixer 126b with carrier signal 130b generated by oscillator 128, thereby shifting signals to the band of frequencies corresponding to the passband sub-channel. In some embodiments, the mixer 126b is a multiplier. In some embodiments, more than one mixer may be used in a passband circuit, such as passband circuit 116b. In some embodiments, the carrier signal 130b may be a sinusoidal or harmonic signal having an adjustable carrier frequency. In other embodiments, the carrier signal 130b may be a square-wave signal having an adjustable fundamental frequency. Outputs from the baseband circuit 116a and the passband circuit 116b are combined in adder 134 prior to the transmission of signal 136 in the first communications channel.

In some embodiments, the baseband circuit 116a and the passband circuit 116b may modulate the first subset 118a of the data stream 110 and/or the second subset 118b of the data stream 110, respectively. In some embodiments, the modulation in the baseband circuit 116a is different from that used in the passband circuit 116b, which is also referred to as bit-loading. Suitable modulation in the baseband circuit 116a includes 2 or more level pulse amplitude modulation (PAM), such as two-level PAM or four-level PAM. Suitable modulation in the passband circuit 116b includes 2 or more level pulse amplitude modulation (PAM), also referred to as on-off keying, and, as discussed below, 2 or more level quadrature amplitude modulation (QAM) for passbands that are in quadrature with one another. Other suitable modulations include pulse position modulation (PPM) and pulse width modulation (PWM). In some embodiments, the modulation in one or more respective sub-channels of one of the data transmission/receiving link circuits, such as data transmission/receiving link circuit 64a in FIG. 1, may be different from that used in the other data transmission/receiving link circuits (e.g., link circuits 64b and 64c, FIG. 1).

The data transmission link circuit 100 does not include filters to limit the band of frequencies corresponding to the baseband sub-channel and the passband sub-channel. Instead, use is made of the fact that a rectangular function corresponding to a bit cell in the time domain corresponds to a sinc function in the frequency domain, and that a magnitude of a first sideband of the sinc function is 20 dB less than the magnitude of its peak. In some embodiments, the respective band of frequencies corresponding to the respective guardband may therefore be adjusted by appropriately setting one or more of the clock signals 138 (and thus the corresponding bit cell times) and/or the carrier or fundamental frequency of the carrier signal 130b.

In the absence of band limiting associated with filters, however, the data transmission link circuit 100, will have constraints on how hard the transmit buffers 122 may be driven. In particular, in embodiments with additional passband circuits, transmit power may be reduced in order to ensure that there is sufficient voltage swing available for the transmit buffers 122. This may result in poorer performance, for example, a higher error rate.

Figure 2B:
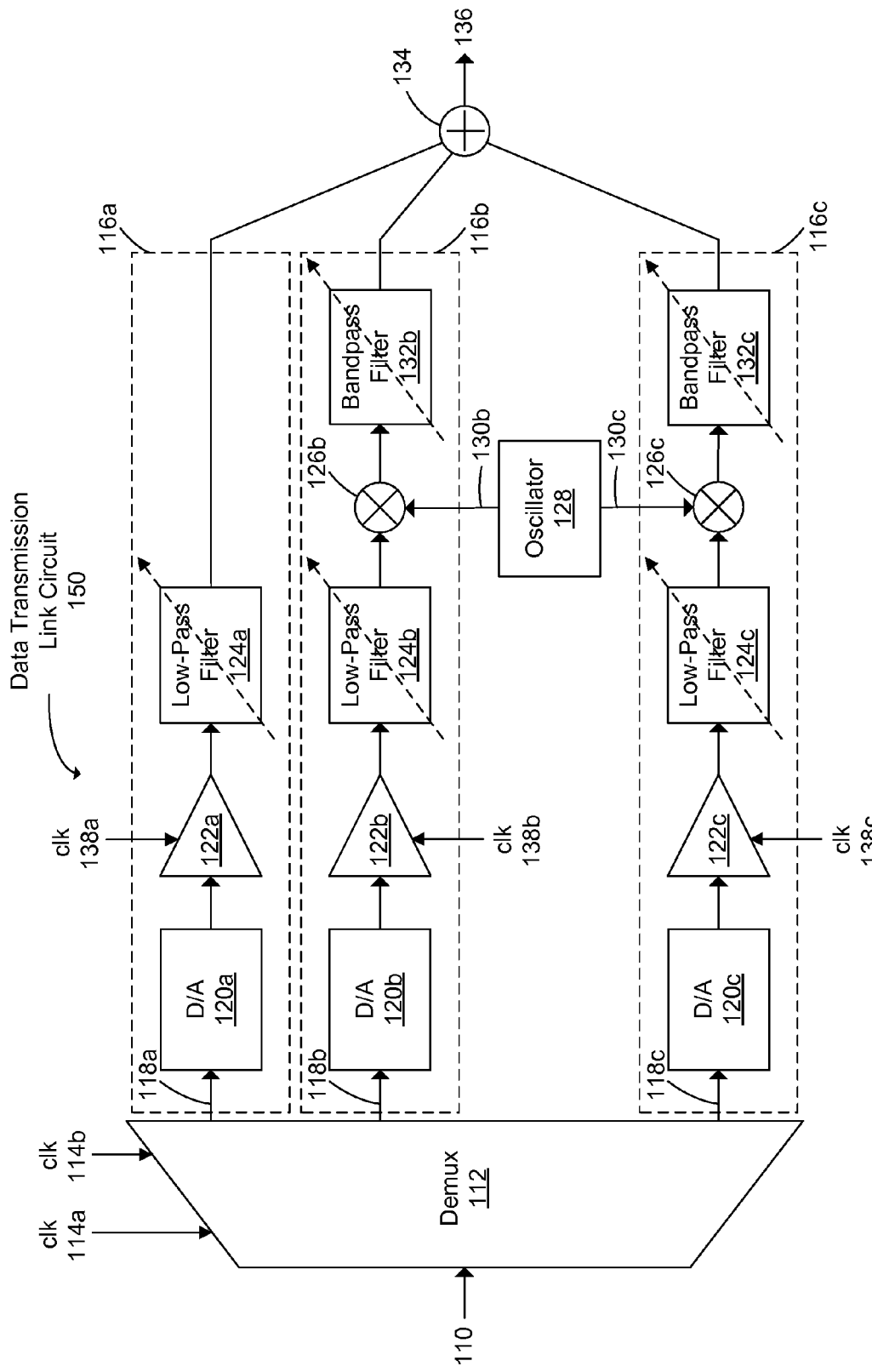
FIG. 2b is a block diagram illustrating a transmission communication link circuit.

FIG. 2b illustrates an embodiment of data transmission communication link circuit 150. The baseband circuit 116a and the passband circuit 116b contain an adjustable low-pass filter 124. In some embodiments, one or more low-pass filters 124 may have fixed characteristics that cannot be dynamically adjusted during normal operation of the link circuit 150. The passband circuit 116b also includes an adjustable bandpass filter 132b. Therefore, in addition to setting one or more clock signals 138 and/or the carrier or fundament frequency of the carrier signal 130b, the respective band of frequencies corresponding to the respective guardband may be adjusted by setting a corner frequency of the low-pass filter 124a, a corner frequency of the low-pass filter 124b and/or a bandwidth of the bandpass filter 132b. In addition to the added degrees of freedom in adjusting the respective guardband, the low-pass filters 124 and the bandpass filter 132b also reduce the transmit power constraints associated with additional sub-channels described previously.

FIG. 2b also illustrates an optional third subset 118c of the datastream 110 and an optional passband circuit 116c with a corresponding passband sub-channel that is in quadrature with that associated with passband circuit 116b. The oscillator 128 generates a carrier signal 130c that is 90° out of phase with the carrier signal 130b. The carrier signal 130b and the carrier signal 130c can also be described as a vector having an in-phase component and an out-of-phase component. Thus, the passband corresponding to the passband circuit 116b may be described as an in-phase passband and the passband corresponding to the passband circuit 116c may be described as an out-of-phase passband. Other components (120c, 122c, 124c, 126c, 132c) in the passband circuit 116c have functions corresponding to those in the passband circuit 116b. Note that the use of an additional passband sub-channel that is in quadrature also reduces the power constraint associated with additional sub-channels described previously. Also note that in some embodiments the data transmission link circuit 150 may include one or more additional passband circuits and/or additional pairs of passband circuits whose passband sub-channels are in quadrature.

FIGS. 2a and 2b illustrate embodiments of data transmission link circuits 100 and 200 that use so-called direct conversion. Other embodiments may use so-called heterodyne conversion, where signals are converted to one or more intermediate frequencies before conversion to baseband. In these embodiments, more than one mixer, such as the mixer 126b, in a passband circuit, such as passband circuit 116b, may be used. In addition, in some embodiments the low-pass 124 and the bandpass filters 132 in FIG. 2b, as well as in other embodiments below, may be excluded.

FIG. 3a illustrates an embodiment of data receiving communication link circuit 200. The data receiving link circuit 200 uses multi-tone communication. An input 210 received from the first communication channel is coupled to the baseband circuit 212a and the passband circuit 212b. In some embodiments, the data receiving link circuit 200 may include one or more additional passband circuits.

The input is mixed in mixer 216b with carrier signal 220b generated by oscillator 218, thereby shifting signals from the band of frequencies corresponding to the passband sub-channel. In some embodiments, the mixer 216b is a multiplier. In some embodiments, the passband circuit 212b includes more than one mixer, such as the mixer 216b. In some embodiments, the carrier signal 220b may be a sinusoidal or harmonic signal having an adjustable carrier frequency. In other embodiments, the carrier signal 220b may be a square-wave signal having an adjustable fundamental frequency.

An output of the mixer 216b in the passband circuit 212b and the input in the baseband circuit 212a are coupled to receive buffers 224. The receive buffers 224 are coupled to adjustable clock signals 226 that gate an output from the receive buffers 224. The baseband circuit 212a and the passband circuit 212b also include respective analog-to-digital converters 228a, 228b.

A first subset 230a of a data stream is output by analog-to-digital converter 228a, and a second subset 230b of the data stream is output by analog-to-digital converter 228b. The first and second subsets 230a, 230b of the data stream are coupled to multiplexer 232 and are combined into a data stream 236 using clock signals 234.

The first and second subsets 230a, 230b of the data stream each have a symbol rate that is less than the symbol rate of data stream 236. The clock signals 226 and 234 may be generated from a common signal generator, such as a phase lock loop or a delay lock loop (for example, using a divider), or from separate signal generators.

In some embodiments, the baseband circuit 212a and the passband circuit 212b may demodulate the first subset 230a of the data stream and/or the second subset 230b of the data stream, respectively. The demodulation reverses the modulation used in the corresponding data transmission link circuit, such as data transmission link circuit 100 (FIG. 2a) on the other end of the communication channel. The information necessary for accomplishing the demodulation may be provided to the data receiving link circuit 200 using the second communication channel. In some embodiments, the modulation in the baseband circuit 212a is different from that used in the passband circuit 212b, which is also referred to as bit-loading. Suitable demodulation in the baseband circuit 212a includes two or more level pulse amplitude modulation (PAM), such as two-level PAM or four-level PAM. Suitable demodulation in the passband circuit 212b includes two or more level pulse amplitude modulation (PAM), also referred to as on-off keying, and two or more level quadrature amplitude modulation (QAM) for passbands that are in quadrature with one another. Other suitable modulation include pulse position modulation (PPM) and pulse width modulation (PWM). In some embodiments, the demodulation in one or more sub-channels of one of the data transmission/receiving link circuits, such as data transmission/receiving link circuit 64a in FIG. 1, may be different from that used in other data transmission/receiving link circuits.

The data receiving link circuit 200 does not include filters to limit the band of frequencies corresponding to the baseband sub-channel and the passband sub-channel. Instead, use is made of the fact that a rectangular function corresponding to the bit cell in the time domain corresponds to the sinc function in the frequency domain and that the magnitude of the first sideband of the sinc function is 20 dB less than the magnitude of its peak. In some embodiments, the band of frequencies corresponding to the guardband may therefore be adjusted by appropriately setting one or more of the clock signals 226 (and thus the corresponding bit cell times) and/or the carrier or fundamental frequency of the carrier signal 220b. Values of the clock signals 226 and/or the carrier or fundamental frequency of the carrier signal 220b correspond to those used in the corresponding data transmission link circuit, such as data transmission link circuit 100 (FIG. 1), on the other end of the communication channel. The information necessary for setting these configuration values in the data receiving link circuit 200 may be provided to the data receiving link circuit 200 using the second communication channel, a baseband sub-channel or a passband sub-channel.

Figure 3B:
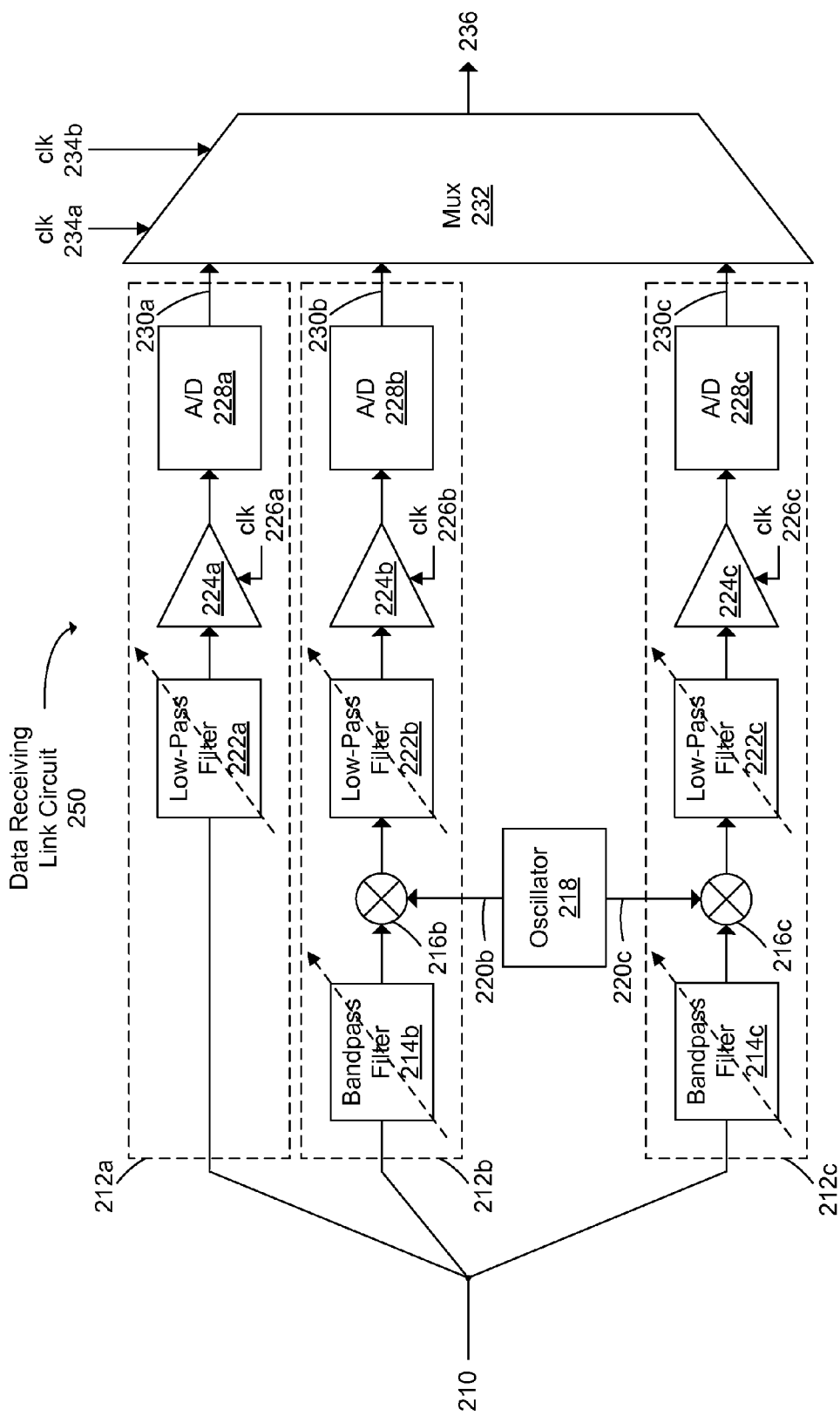
FIG. 3b is a block diagram illustrating a receiving communication link circuit.

FIG. 3b illustrates an embodiment of data receiving communication link circuit 250. The baseband circuit 212a and the passband circuit 212b contain respective adjustable low-pass filters 222a, 222b. In some embodiments, one or more low-pass filters 222 may have fixed characteristics. The passband circuit 212b also includes an adjustable bandpass filter 214b. Therefore, in addition to setting one or more clock signals 226 and/or the carrier or fundament frequency of the carrier signal 220b, the respective band of frequencies corresponding to the respective guardband may be adjusted by setting a corner frequency of a low-pass filter 222a, a corner frequency of a low-pass filter 222b and/or a bandwidth of the bandpass filter 214b.

FIG. 3b also illustrates an optional passband circuit 212c with a corresponding passband sub-channel that is in quadrature with that associated with passband circuit 212b. The oscillator 218 generates a carrier signal 220c that is 90° out of phase with the carrier signal 220b. The carrier signal 220b and the carrier signal 220c can also be described as a vector having an in-phase component and an out-of-phase component. Thus, the passband corresponding to the passband circuit 212b may be described as an in-phase passband and the passband corresponding to the passband circuit 212c may be described as an out-of-phase passband. The other components (214c, 216c, 222c, 224c, 228c) in the passband circuit 212c have functions corresponding to those in the passband circuit 212b. The optional passband circuit 212c outputs a third subset 230c of the datastream. The values of the settings for the corner frequencies of the low-pass filters 222a, 222b, 222c and the bandwidths of the bandpass filters 214b, 214c correspond to those used in the corresponding data transmission link circuit, such as data transmission link circuit 150 (FIG. 2b), on the other end of the communication channel. These may be provided to the data receiving link circuit 200 using the second communication channel. Also note that in some embodiments the data receiving link circuit 250 may include one or more additional passband circuits and/or additional pairs of passband circuits whose passband sub-channels are in quadrature.

FIGS. 3a and 3b illustrate embodiments of data receiving link circuits 200 and 250 that use so-called direct conversion. Other embodiments may use so-called heterodyne conversion, where signals are converted to one or more intermediate frequencies before conversion to baseband. In these embodiments, more than one mixer, such as the mixer 216b, in a passband circuit, such as passband circuit 212b, may be used. In addition, in some embodiments the low-pass 214 and the bandpass filters 222 in FIG. 3b may be excluded.

The data transmission link circuit 150 and the data receiving link circuit 250 illustrate adjustable analog filters. In other embodiments, the adjustable filters may be implemented in a digital domain after analog-to-digital conversion, for example, as an FIR filter.

Figure 5:
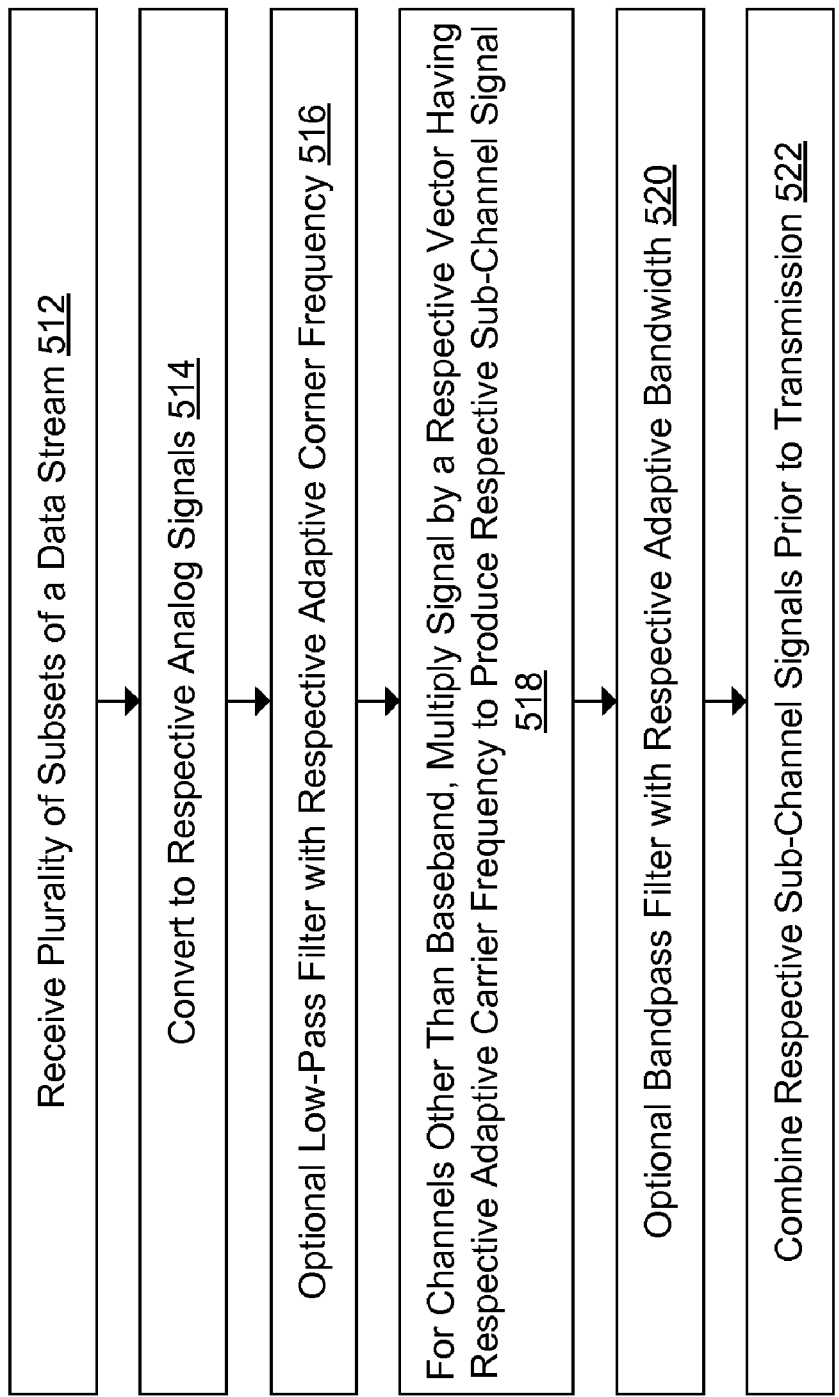
FIG. 5 is a flow diagram illustrating a method of operating an adjustable link.

FIG. 5 is a flow diagram illustrating an embodiment of a method or process for transmission of data using an adjustable link. A plurality of subsets of the data stream are received 512. These are converted into respective analog signals 514. In some embodiments, the respective analog signals are low-pass filtered using respective filters having respective adaptive corner frequencies 516. For sub-channels other than baseband, the respective analog signals are mixed with respective vectors having respective adaptive carrier or fundamental frequencies to produce respective sub-channel signals 518. In some embodiments, mixing is accomplished using signal multiplication. In some embodiments, the respective sub-channel signals are bandpass filtered using respective filters having respective adaptive bandwidths 520. The respective sub-channel signals are combined prior to transmission 522 to produce a composite signal for transmission across a communication channel. Tasks 512 through 522 may be performed continuously, in pipeline fashion, on a continuing data stream. By adjusting one or more bands of frequencies, such as the first band of frequencies 318 (FIG. 4) or the second band of frequencies 320 (FIG. 4), at least one adjacent guardband of frequencies corresponding to one or more notches, such as notch band of frequencies 322, may be defined.

Figure 6:
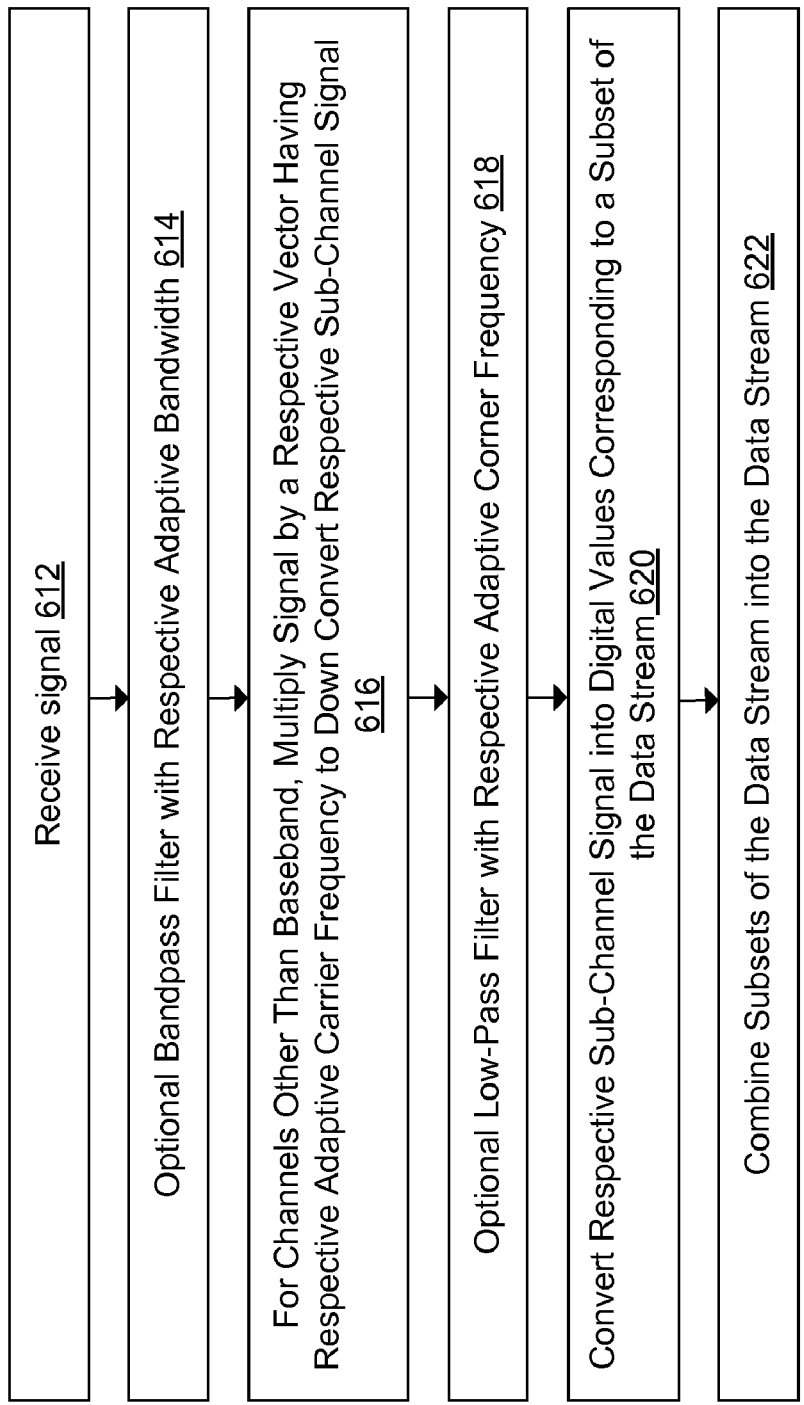
FIG. 6 is a flow diagram illustrating a method of operating an adjustable link.

FIG. 6 is a flow diagram illustrating an embodiment of a method or process for receiving data using the adjustable link. An input signal is received 612. In some embodiments, the signal is bandpass filtered using respective bandpass filters having respective adaptive bandwidths 614 to produce a set of sub-channel signals. The sub-channel signals, other than the baseband sub-channel signal, are mixed with respective vectors having respective adaptive carrier or fundamental frequencies to down convert the respective sub-channel signals 616. In some embodiments, the mixing is accomplished using signal multiplication. In some embodiments, the resulting sub-channel signals are low-pass filtered using respective filters having respective adaptive corner frequencies 618. The sub-channel signals are converted into digital values corresponding to respective subsets of the data stream 620. The sub-sets of the data stream are combined 622 to produce a recovered data stream. Tasks 612 through 522 may be performed continuously, in pipeline fashion, on a successive portions of a received signal so as to produce a continuing data stream. Once again, by adjusting one or more bands of frequencies, such as the first band of frequencies 318 (FIG. 4) or the second band of frequencies 320 (FIG. 4), at least one adjacent guardband of frequencies corresponding to one or more notches, such as notch band of frequencies 322, may be defined.

Figure 7:
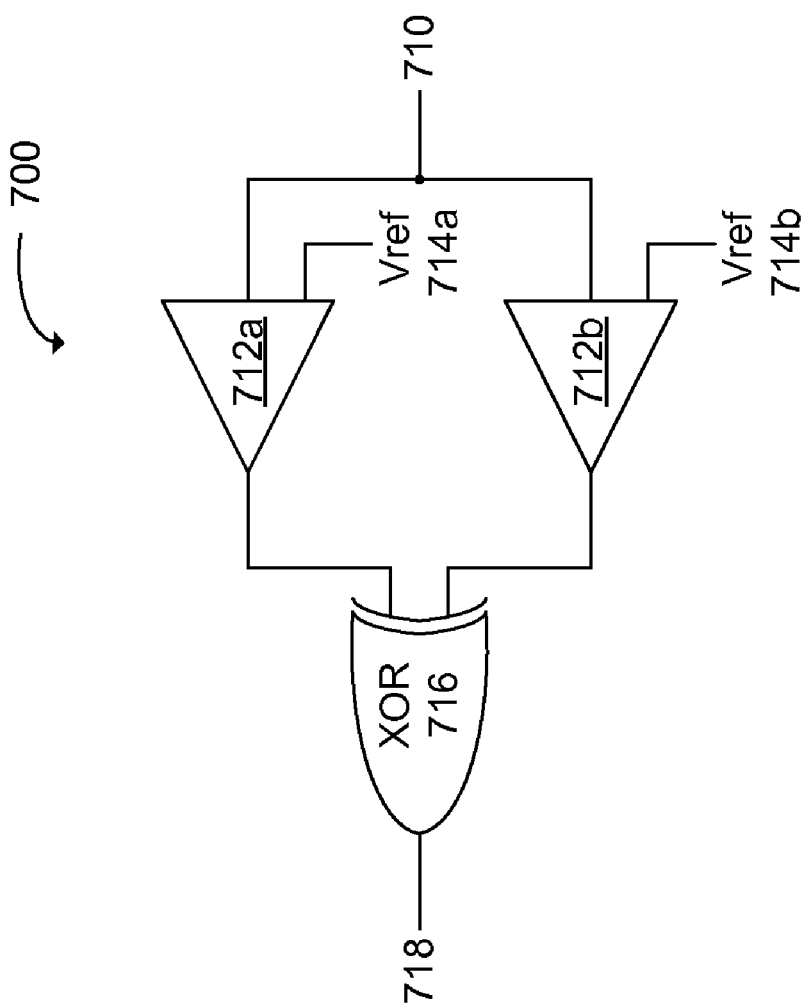
FIG. 7 is a block diagram illustrating a circuit having the function of an oscilloscope, herein called an escope, in a receiving communication link circuit.

Referring to FIG. 1, for one or more respective data transmission/receiving communication link circuits 64 (FIG. 1) and/or one or more data transmission/receiving communication link circuits 68 (FIG. 2), characteristics of the communication channel, such as signal line 66a, may be determined jointly or independently. In addition, for the respective data transmission/receiving communication link, the communication channel may be characterized for one or more respective sub-channels. In some embodiments, such channel characterization may use a circuit having the function of an oscilloscope, herein called an escope 700, as illustrated in FIG. 7. The escope 700 is coupled to respective sub-channel signals in one or more data receiving communication link circuits, such as data receiving communication link circuit 200 (FIG. 3a) and data receiving communication link circuit 250 (FIG. 3b), between the receive buffer 224 (FIGS. 3a and 3b) and the analog-to-digital converter 228 (FIGS. 3a and 3b). Analog signals 710 corresponding to a respective sub-channel are coupled to comparators 712. The escope 700 is intended for use with 2-PAM modulation. By adding additional comparators 712 it may be extended to an arbitrary multi-level modulation. Each comparator has a respective reference voltage 714. In some embodiments, one reference voltage, such as reference voltage 714a, corresponds to a logical 1 or high voltage state and another, such as reference voltage 714b, to a logical 0 or a low voltage state. In other embodiments, one reference voltage may be fixed and another reference voltage may be varied. For example, one reference voltage may be at threshold, i.e., a data slicer, and one may be anywhere in the eye pattern. In embodiments with multi-level modulation, multiple samples may be taken. Outputs from the comparators 712 are coupled to an XOR gate or logical comparator 716, which generates an output 718. The XOR gate or logical comparator 716 may be implemented in hardware or software. By adjusting one or the reference voltages 714 (for example, using the control logic 78 in FIG. 1), the output 718 corresponds to a cross-section of a portion of an eye pattern. The portion of the eye pattern corresponds to a logical 0 or 1 decision at a respective sample time. In this way, a voltage margin may be determined.

By further adjusting one or more of the respective clock signals 226 (FIGS. 3a and 3b), cross-sections of the eye pattern at different sample times may be determined using the escope 700. In this way, a timing margin may also be determined. Such voltage and timing margin measurements allow characteristics of the communication channel to be determined. In some embodiments, the channel may also be characterized based on a bit error rate and/or the pulse response in one or more sub-channels in a respective data transmission/ receiving link circuit, such as data transmission/receiving link circuit 64a (FIG. 1). In some embodiments, the channel may also be characterized based on a bit error rate and/or the pulse response in one or more of data transmission/receiving link circuits 64 or data transmission/receiving link circuits 68.

In other embodiments, the escope 700 may be used to characterize a channel, including one or more notches, such as the first notch 316 (FIG. 4), in the frequency domain. Such a frequency-domain measurement may be performed using a dedicated measurement channel having a single mixer and no low-pass or band-pass filters. Alternatively, the corner frequencies of one or more low-pass and/or bandpass filters in a sub-channel circuit, such as passband sub-channel 116c (FIG. 2b), may be appropriately adjusted and any additional mixers may be disabled. While other sub-channels are disabled, a DC-signal may be transmitted over the dedicated measurement channel or the respective sub-channel. By varying the carrier frequency of the sinusoidal or harmonic signal generated by an oscillator, such as oscillator 128 (FIG. 2b), a frequency range of interest may be swept. At each carrier frequency, the escope 700 may be used to measure a maximum received signal magnitude, which is inversely proportional to the channel loss.

After determining one or more channel characteristics, a respective low-pass filter corner frequency, a respective clock signal, a respective bandpass filter bandwidth and/or a respective carrier or fundamental frequency may be adjusted by control logic 78 (FIG. 1) for one or more sub-channels in one or more data transmission/receiving circuits, such as data transmission/receiving circuit 64a (FIG. 1). In some embodiments, determination of one or more channel characteristics and adjustment of one or more sub-channel circuit values, such as those listed above, in one or more data transmission/receiving circuits, such as data transmission/receiving circuit 64a (FIG. 1), may be repeated iteratively.

In some embodiments, in the respective data transmission/receiving circuit, such as data transmission/receiving circuit 64a (FIG. 1), a band of frequencies corresponding to a respective sub-channel, such as the first band of frequencies 318 (FIG. 4), may be fixed and another band of frequencies, such as the second band of frequencies 320 (FIG. 4), may be an integer multiple of the first band of frequencies 318 (FIG. 4). This allows the use of a single clock in determining one or more eye patterns for one or more sub-channels using the escope 700.

Some embodiments of the data transmission/receiving circuits, such as data transmission/receiving circuit 64a (FIG. 1), may also include preceding, transmission equalization and/or receiving equalization.

The adjustable link apparatus and method are well-suited for use in communication between two or more semiconductor chips or dies, for example, in electronic interconnects and data buses. In particular, the apparatus and method are well-suited for use in improving the utilization of available bandwidth in communication channels between semiconductor chips on the same printed circuit board (PCB) or between semiconductor chips on different printed circuit boards that are connected through a backplane, signal lines or a coaxial cable at data rates exceeding multiple Gbps (gigabits per second), for example rates of at least 2, 5 or 10 Gbps, depending on the embodiment.

The adjustable link apparatus and method are also well-suited for use in improving communication between modules in an integrated circuit. The adjustable link may be used in communication between a memory controller chip and a dynamic random access memory (DRAM) chip. The DRAM chip may be either on the same printed circuit board as the controller or embedded in a memory module. In addition, the adjustable link apparatus and method are also well-suited for use in improving communication at data rates exceeding multiple Gbps, such as 2, 5 or 10 Gbps, depending on the embodiment, between a buffer chip and a DRAM chip, both of which are on the same memory module. The apparatus and methods described herein may also be applied to other memory technologies, such as static random access memory (SRAM) and electrically erasable programmable read-only memory (EEPROM).

Devices and circuits described herein can be implemented using computer aided design tools available in the art, and embodied by computer readable files containing software descriptions of such circuits, at behavioral, register transfer, logic component, transistor and layout geometry level descriptions stored on storage media or communicated by carrier waves. Data formats in which such descriptions can be implemented include, but are not limited to, formats supporting behavioral languages like C, formats supporting register transfer level RTL languages like Verilog and VHDL, and formats supporting geometry description languages like GDSII, GDSIII, GDSIV, CIF, MEBES and other suitable formats and languages. Data transfers of such files on machine readable media including carrier waves can be done electronically over the diverse media on the Internet or through email, for example. Physical files can be implemented on machine readable media such as 4 mm magnetic tape, 8 mm magnetic tape, 3½ inch floppy media, CDs, DVDs and so on.

The foregoing descriptions of specific embodiments of the present embodiments are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A system, comprising:
 a first communication channel having a channel response that includes at least a first notch;
 a first integrated circuit coupled to the first communication channel, the first integrated circuit to send a first data stream over a baseband sub-channel in the first communication channel and a second data stream over a passband sub-channel in the first communication channel, the baseband sub-channel and the passband sub-channel being separated from each other by a guardband of frequencies corresponding to the first notch; and
 a second integrated circuit coupled to the first communication channel, the second integrated circuit to receive the first data stream and the second data stream from the baseband sub-channel and the passband sub-channel, respectively, and to generate a third data stream having a symbol rate higher than a symbol rate of either the first data stream or the second data stream, the third data stream including data in the first data stream and the second data stream.

2. The system of claim 1, wherein the first integrated circuit includes logic to determine settings of the baseband sub-channel and the passband sub-channel.

3. The system of claim 2, wherein the first integrated circuit includes memory to store the settings.

4. The system of claim 1, wherein the first communication channel is ac-coupled to the first integrated circuit, and the baseband sub-channel does not include DC.

5. The system of claim 1, wherein the first integrated circuit is configured to adjust a passband carrier frequency to define the guardband.

6. The system of claim 1, wherein the first communication channel is a data bus having a plurality of signal lines each having a respective channel response.

7. The system of claim 6, wherein the first integrated circuit includes a plurality of data transmission circuits corresponding to respective ones of the plurality of signal lines, and the second integrated circuit includes a plurality of data receiving circuits corresponding to respective ones of the plurality of signal lines and to respective ones of the plurality of data transmission circuits.

8. The system of claim 7, wherein one of the data transmission circuits includes a baseband circuit to form a signal carrying the first data stream and at least one passband circuit to form a signal carrying the second data stream.

9. The system of claim 1, wherein the combined bandwidth of the first communication channel is more than 1 GHz, and the guardband is at least 0.25 GHz wide.

10. The system of claim 1, wherein the first and second data streams are modulated with different modulations.

11. The system of claim 1, wherein the first integrated circuit converts the second data stream into a passband signal, using a conversion scheme selected from the group consisting of direct conversion and heterodyne conversion.

12. The system of claim 1, further comprising at least one second communication channel for communicating information about sub-channel settings associated with the first communication channel between the first integrated circuit and the second integrated circuit.

13. The system of claim 1, wherein the first integrated circuit is configured to send a fourth data stream over an additional passband sub-channel that is in quadrature with the passband sub-channel over which the first integrated circuit sends the second data stream.

14. The system of claim 1, wherein the second integrated circuit generates the third data stream by combining the first data stream from the baseband sub-channel and the second data stream from the passband sub-channel.

15. The system of claim 1,
the passband sub-channel comprising a first passband sub-channel, and the guardband comprising a first guardband;
the first communication channel having a channel response that includes at least the first notch and a second notch;
the first integrated circuit configured to send a fourth data stream over a second passband sub-channel in the first communication channel, the second passband sub-channel being separated from the first passband sub-channel by a second guardband of frequencies corresponding to the second notch; and
the second integrated circuit configured to receive the fourth data stream from the second passband sub-channel and to generate the third data stream with data from the first, second and fourth data streams.

16. The system of claim 1, wherein the channel response of the first communication channel is selected from the group consisting of a transfer function of the first communication channel, a step response of the first communication channel, and an impulse or pulse response of the first communication channel.

17. A data transmission method, comprising:
at a first integrated circuit coupled to a first communication channel, having a channel response that includes at least a first notch, sending a first data stream over a baseband sub-channel in the first communication channel and a second data stream over a passband sub-channel in the first communication channel, the baseband sub-channel and the passband sub-channel being separated from each other by a guardband of frequencies corresponding to the first notch; and
at a second integrated circuit coupled to the first communication channel, receiving the first data stream and the second data stream from the baseband sub-channel and the passband sub-channel, respectively, and generating a third data stream having a symbol rate higher than a symbol rate of either the first data stream or the second data stream, the third data stream including data in the first data stream and the second data stream.

18. The data transmission method of claim 17, including storing in memory of the first integrated circuit settings of the baseband sub-channel and the passband sub-channel.

19. The data transmission method of claim 17, including ac-coupling the first integrated circuit to the first communication channel.

20. The data transmission method of claim 17, including adjusting a passband carrier frequency utilized by the first integrated circuit so as to define the guardband.

21. The data transmission method of claim 17, wherein the first communication channel is a data bus having a plurality of signal lines each having a respective channel response.

22. The data transmission method of claim 21, including:
at the first integrated circuit, transmitting data using a plurality of data transmission circuits corresponding to respective ones of the plurality of signal lines; and
at the second integrated circuit, receiving the transmitted data using a plurality of data receiving circuits corresponding to respective ones of the plurality of signal lines and to respective ones of the plurality of data transmission circuits.

23. The data transmission method of claim 17, wherein the combined bandwidth of the first communication channel is more than 1 GHz, and the guardband is at least 0.25 GHz wide.

24. The data transmission method of claim 17, including modulating the first and second data streams at the first integrated circuit with different modulations.

25. The data transmission method of claim 17, including, at the first integrated circuit, converting the second data stream into a passband signal, using a conversion scheme selected from the group consisting of direct conversion and heterodyne conversion.

26. The data transmission method of claim 17, including communicating, via at least one second communication channel, information about sub-channel settings associated with the first communication channel between the first integrated circuit and the second integrated circuit.

27. The data transmission method of claim 17, including, at the first integrated circuit, sending a fourth data stream over an additional passband sub-channel that is in quadrature with the passband sub-channel over which the first integrated circuit sends the second data stream.

28. The data transmission method of claim 17, including, at the second integrated circuit, generating the third data stream by combining the first data stream from the baseband sub-channel and the second data stream from the passband sub-channel.

29. The data transmission method of claim 17, wherein the passband sub-channel comprises a first passband sub-channel and the guardband of frequencies corresponding to the first notch comprises a first guardband of frequencies;
the method including,
at the first integrated circuit, sending a fourth data stream over an additional passband sub-channel that separated from the first passband sub-channel by a second notch in the channel response of the first communication channel; and
at the second integrated circuit, receiving the fourth data stream from the second passband sub-channel and generating the third data stream with data from the first, second and fourth data streams.

* * * * *